US006495630B2

(12) United States Patent
Adedeji et al.

(10) Patent No.: US 6,495,630 B2
(45) Date of Patent: Dec. 17, 2002

(54) POLY(ARYLENE ETHER)-POLYOLEFIN COMPOSITIONS AND ARTICLES DERIVED THEREFROM

(75) Inventors: Adeyinka Adedeji, Albany, NY (US); Thomas J. Hartle, Delmar, NY (US); John C. Haylock, Schenectady, NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/682,919

(22) Filed: Nov. 1, 2001

(65) Prior Publication Data

US 2002/0143097 A1 Oct. 3, 2002

Related U.S. Application Data

(60) Provisional application No. 60/258,834, filed on Dec. 28, 2000.

(51) Int. Cl.$^7$ .............................................. C08L 53/00
(52) U.S. Cl. ....................................................... 525/89
(58) Field of Search ........................................... 525/89

(56) References Cited

U.S. PATENT DOCUMENTS

| | | |
|---|---|---|
| 4,239,673 A | 12/1980 | Lee, Jr. |
| 4,242,263 A | 12/1980 | Lee, Jr. |
| 4,299,757 A | 11/1981 | Kuribayashi et al. |
| 4,383,082 A | 5/1983 | Lee, Jr. |
| 4,460,743 A | 7/1984 | Abe et al. |
| 4,713,416 A | 12/1987 | Del Giudice et al. |
| 4,764,559 A | 8/1988 | Yamauchi et al. |
| 4,772,657 A | 9/1988 | Akiyama et al. |
| 4,863,997 A | 9/1989 | Shibuya et al. |
| 4,892,904 A | 1/1990 | Ting |
| 4,962,148 A | 10/1990 | Orikasa et al. |
| 4,985,495 A | 1/1991 | Nishio et al. |
| 4,990,558 A | 2/1991 | DeNicola, Jr. et al. |
| 4,994,508 A | 2/1991 | Shiraki et al. |
| 5,061,753 A | 10/1991 | Maruyama et al. |
| 5,071,911 A | 12/1991 | Furuta et al. |
| 5,071,912 A | 12/1991 | Furuta et al. |
| 5,075,376 A | 12/1991 | Furuta et al. |
| 5,079,295 A | 1/1992 | Furuta et al. |
| 5,081,187 A | 1/1992 | Maruyama et al. |
| 5,086,112 A | 2/1992 | Togo et al. |
| 5,106,696 A | 4/1992 | Chundury et al. |
| 5,124,410 A | 6/1992 | Campbell |
| 5,132,363 A | 7/1992 | Furuta et al. |
| 5,149,740 A | 9/1992 | Maruyama et al. |
| 5,159,004 A | 10/1992 | Furuta et al. |
| 5,162,433 A | 11/1992 | Nishio et al. |
| 5,162,435 A | 11/1992 | Shibuya et al. |
| 5,162,440 A | 11/1992 | Akkapeddi et al. |
| 5,166,264 A | 11/1992 | Lee, Jr. et al. |
| 5,182,151 A | 1/1993 | Furuta et al. |
| 5,191,024 A | 3/1993 | Shibata et al. |
| 5,206,281 A | 4/1993 | Furuta |
| 5,262,477 A | 11/1993 | Kasai et al. |
| 5,268,425 A | 12/1993 | Furuta et al. |
| 5,272,208 A | 12/1993 | Shiraki et al. |
| 5,272,209 A | 12/1993 | Shiraki et al. |
| 5,278,220 A | 1/1994 | Vermeire et al. |
| 5,286,791 A | 2/1994 | DeNicola, Jr. et al. |
| 5,290,856 A | 3/1994 | Okamoto et al. |
| 5,296,540 A | 3/1994 | Akiyama et al. |
| 5,304,593 A | 4/1994 | Nishio et al. |
| 5,321,081 A | 6/1994 | Chundury et al. |
| 5,369,173 A | 11/1994 | Furuta |
| 5,370,813 A | 12/1994 | DeNicola, Jr. et al. |
| 5,405,902 A | 4/1995 | Nishio et al. |
| 5,418,287 A | 5/1995 | Tanaka et al. |
| 5,424,360 A | 6/1995 | Nagaoka et al. |
| 5,428,091 A | 6/1995 | Abe et al. |
| 5,461,111 A | 10/1995 | Modic et al. |
| 5,473,015 A | 12/1995 | DeNicola, Jr. et al. |
| 5,494,962 A | 2/1996 | Gauthy et al. |
| 5,648,424 A | 7/1997 | Miwa et al. |
| 5,686,528 A | 11/1997 | Wills et al. |
| 5,705,556 A | 1/1998 | Djiauw et al. |
| 5,777,028 A | 7/1998 | Okada et al. |
| 5,902,850 A | 5/1999 | Chino et al. |
| 6,005,050 A | 12/1999 | Okada et al. |
| 6,013,726 A | 1/2000 | Nakano et al. |
| 6,031,049 A | 2/2000 | Chino et al. |
| 6,045,883 A | 4/2000 | Akiyama et al. |

FOREIGN PATENT DOCUMENTS

| | | |
|---|---|---|
| EP | 0 326 895 A2 | 1/1989 |
| EP | 412787 A2 | 2/1991 |
| JP | 63-113047 | 5/1988 |
| JP | 63-113049 | 5/1988 |
| JP | 63-113050 | 5/1988 |
| JP | 01-098647 | 4/1989 |

(List continued on next page.)

OTHER PUBLICATIONS

Tuftec® H1043 Technical Bulletin, Dec. 16, 1999, Asahi Chemical Industry Co., Ltd., pp. 1–5.
Chemical Abstracts Record for JP 03185058, 12/89.
Chemical Abstracts Record for JP 03231962, 2/90.
Chemical Abstracts Record for JP 04183748, 1/90.
Chemical Abstracts Record for JP 07165998, Dec. 10, 1993.
Chemical Abstracts Record for JP 07166026, 12/93.
Tuftec® P–Series High Performance Thermoplastic Elastomer, pp. 1–2. <http: www.asahi–kasei.co.jp/plastic/e/technical/br/p–series.htm>;5/01.

(List continued on next page.)

Primary Examiner—Edward J. Cain

(57) ABSTRACT

A thermoplastic composition includes specified amounts of poly(arylene ether), a polyolefin, a rubber-modified poly (alkenyl aromatic) resin, a hydrogenated block copolymer, an unhydrogenated block copolymer, and an ethylene/alpha-olefin elastomeric copolymer. The composition provides very high impact strength while maintaining good stiffness. The composition also exhibits low property variability.

38 Claims, No Drawings

FOREIGN PATENT DOCUMENTS

| | | |
|---|---|---|
| JP | 03-259941 | 11/1991 |
| JP | 04-007357 | 1/1992 |
| JP | 04-028739 | 1/1992 |
| JP | 04-028740 | 1/1992 |
| JP | 04-279697 | 10/1992 |
| JP | 04-293942 | 10/1992 |
| JP | 05-070679 | 3/1993 |
| JP | 05-295184 | 11/1993 |
| JP | 06-009828 | 1/1994 |
| JP | 06-016924 | 1/1994 |
| JP | 06-057130 | 3/1994 |
| JP | 06-136202 | 5/1994 |
| JP | 07-003083 | 1/1995 |
| JP | 07-304908 | 12/1995 |
| JP | 09-316322 | 12/1997 |
| JP | 11-060836 | 3/1999 |
| JP | 2000-143891 | 5/2000 |
| WO | WO 90/05759 | 5/1990 |
| WO | WO 91/05016 | 4/1991 |

OTHER PUBLICATIONS

M. K. Akkapeddi and B. VanBuskirk, Adv. Polym. Technol. (1992), vol. 11, No. 4, pp.263–275.

G.–X. Wei, H.–J. Sue, J. Chu, C. Huang, K. Gong, "Morphology and Mechanical Property of Poly(phenylene oxide) Modified Polypropylene Blends", ANTEC '99, vol. III, New York City, May 2nd–6th, 1999, pp. 3443–7.

Chemical Abtracts Record for JP 03181555, 12/89.

U. S. patent application Ser. No. 09/682,920, Adedeji et al., filed Nov. 1, 2001.

U. S. patent application Ser. No. 09/682,921, Adedeji et al., filed Nov. 1, 2001.

U. S. patent application Ser. No. 09/682,923, Adedeji et al., filed Nov. 1, 2001.

U. S. patent application Ser. No. 09/682,926, Adedeji et al., filed Nov. 1, 2001.

U. S. patent application Ser. No. 09/682,928, Adedeji et al., filed Nov. 1, 2001.

U. S. patent application Ser. No. 09/682,929, Adedeji et al., filed Nov. 1, 2001.

U. S. patent application Ser. No. 09/683,766, Adedeji et al., filed Feb. 12, 2002.

U. S. patent appliation Ser. No. 10/063,336, Adedeji et al., filed Apr. 12, 2002.

POLY(ARYLENE ETHER)-POLYOLEFIN COMPOSITIONS AND ARTICLES DERIVED THEREFROM

Cross Reference to Related Applications

This application claims the benefit of U.S. Provisional Application Serial No. 60/258,834, filed Dec. 28, 2000.

BACKGROUND OF INVENTION

Compositions comprising poly(arylene ether)s and polyolefins are known in the art, and compositions further comprising specific impact modifiers and compatibilizing agents have been described.

U.S. Pat. No. 4,713,41 6 to Del Giudice et al. generally describes compositions comprising (a) a polyphenylene ether, (b) a thermoplastic polymer incompatible with the PPE, and (c) a polymeric compatibility-promoting agent comprising one or more blocks of vinylaromatic monomer units compatible with the polyphenylene ether (a) and one or more blocks of monomeric units of the same nature as the thermoplastic polymer (b) or compatible with that polymer.

U.S. Pat. No. 4,764,559 to Yamauchi et al. generally describes a composition comprising (a) a polyphenylene ether having a low degree of polymerization, with or without a styrene resin, (b) a polyolefin, and (c) a styrene compound/conjugated diene block copolymer or a hydrogenation product thereof.

U.S. Pat. No. 4,863,997 to Shibuya et al. generally describes a composition comprising (a) a polyolefin resin, (b) a polyphenylene ether resin, and (c) a hydrogenated block copolymer of an alkenyl aromatic compound and a conjugated diene that contains 45–80 weight percent of a repeating unit derived from the alkenyl aromatic compound.

U.S. Pat. No. 5,071,91 2 to Furuta et al. generally describes a composition comprising (a) a polyphenylene ether, (b) a styrene-modified propylene polymer or a composition containing a styrene-modified propylene polymer and polypropylene, and (c) at least two rubbery substances, one being compatible with (a) and the other incompatible with (a).

U.S. Pat. No. 5,081,187 to Maruyama et al. generally describes a composition comprising specific amounts of (a) a polyolefin, (b) a polyphenylene ether, (c) a partially hydrogenated alkenyl aromatic compound-isoprene block copolymer, and (d) an alkenyl aromatic compound-conjugated diene block copolymer.

U.S. Patent No. 5,418,287 to Tanaka et al. generally describes a composition comprising (a) a polyphenylene ether, (b) a crystalline polyolefin resin, and (c) a graft copolymer where the backbone is a copolymer of (i) ethylene or at least one $C_3$–$C_{12}$ alpha-olefin, and (ii) at least one chain nonconjugated diene.

U.S. Patent No. 6,031,049 to Chino et al. generally describes a composition comprising specific amounts of (a) a component composed of syndiotactic polystyrene and a polyolefin, (b) a block or graft styrene-olefin copolymer having a styrene content of 40 to 85% by weight, and (c) a polyphenylene ether.

European Patent Application No. 41 2,787 A2 to Furuta et al. generally describes compositions comprising (a) a polyphenylene ether, (b) a propylene polymer modified by grafting with a styrene-based monomer alone or in combination with another copolymerizable monomer, with or without an unmodified propylene polymer, and (c) a rubbery substance having chain A miscible with all or part of (a) and chain B miscible with all or part of (b).

The commercial value of the above described compositions has been limited by deficiencies in the balance between stiffness and impact strength, as well as the inconsistency of various properties from batch to batch and from molded sample to molded sample within the same batch. There remains a need for poly(arylene ether)-polyolefin compositions having improved property balances. In particular, there remains a need for poly(arylene ether)-polyolefin compositions exhibiting improved balance between stiffness and impact strength. There also remains a need for poly (arylene ether)-polyolefin compositions exhibiting reduced batch-to-batch and sample-to-sample variability in key properties, including stiffness and impact strength.

SUMMARY OF THE INVENTION

The above described and other drawbacks and disadvantages of the prior art are alleviated by a composition comprising: about 16 to about 40 weight percent of a poly (arylene ether); about 18 to about 40 weight percent of a polyolefin; about 5 to about 20 weight percent of a rubber-modified poly(alkenyl aromatic) resin, wherein the weight ratio of the rubber-modified poly(alkenyl aromatic) resin to the total of the poly(arylene ether) is at least about 3:7; about 2 to about 20 weight percent of a hydrogenated block copolymer of alkenyl aromatic compound and a conjugated diene having an alkenyl aromatic content of about 40 to about 90 weight percent; about 3 to about 20 weight percent of an unhydrogenated block copolymer of alkenyl aromatic compound and a conjugated diene; and about 2 to about 20 weight percent of an ethylene/alpha-olefin elastomeric copolymer; wherein all weight percents are based on the total weight of the composition.

Other embodiments, including articles comprising the composition and its reaction products, are described below.

DETAILED DESCRIPTION

One embodiment is a thermoplastic composition, comprising: about 16 to about 40 weight percent of a poly (arylene ether); about 18 to about 40 weight percent of a polyolefin; about 5 to about 20 weight percent of a rubber-modified poly(alkenyl aromatic) resin, wherein the weight ratio of the rubber-modified poly(alkenyl aromatic) resin to the total of the poly(arylene ether) is at least about 3:7; about 2 to about 20 weight percent of a hydrogenated block copolymer of alkenyl aromatic compound and a conjugated diene having an alkenyl aromatic content of about 40 to about 90 weight percent; about 3 to about 20 weight percent of an unhydrogenated block copolymer of alkenyl aromatic compound and a conjugated diene; and about 2 to about 20 weight percent of an ethylene/alpha-olefin elastomeric copolymer; wherein all weight percents are based on the total weight of the composition.

The composition may comprise any poly(arylene ether). The term poly(arylene ether) includes polyphenylene ether (PPE) and poly(arylene ether) copolymers; graft copolymers; poly(arylene ether) ether ionomers; and block copolymers of alkenyl aromatic compounds, vinyl aromatic compounds, and poly(arylene ether), and the like; and combinations comprising at least one of the foregoing; and the like. Poly(arylene ether)s are known polymers comprising a plurality of structural units of the formula

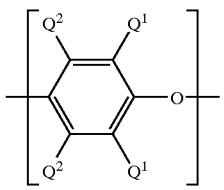

wherein for each structural unit, each $Q^1$ is independently halogen, primary or secondary $C_1$–$C_8$ alkyl, phenyl, $C_1$–$C_8$ haloalkyl, $C_1$–$C_8$ aminoalkyl, $C_1$–$C_8$ hydrocarbonoxy, or $C_2$–$C_8$ halohydrocarbonoxy wherein at least two carbon atoms separate the halogen and oxygen atoms; and each $Q^2$ is independently hydrogen, halogen, primary or secondary $C_1$–$C_8$ alkyl, phenyl, $C_1$–$C_8$ haloalkyl, $C_1$–$C_8$ aminoalkyl, $C_1$–$C_8$ hydrocarbonoxy, or $C_2$–$C_8$ halohydrocarbonoxy wherein at least two carbon atoms separate the halogen and oxygen atoms. Preferably, each $Q^1$ is alkyl or phenyl, especially $C_{1-4}$ alkyl, and each $Q^2$ is independently hydrogen or methyl.

Both homopolymer and copolymer poly(arylene ether)s are included. The preferred homopolymers are those comprising 2,6-dimethylphenylene ether units. Suitable copolymers include random copolymers comprising, for example, such units in combination with 2,3,6-trimethyl-1,4-phenylene ether units or copolymers derived from copolymerization of 2,6-dimethylphenol with 2,3,6-trimethylphenol. Also included are poly(arylene ether)s containing moieties prepared by grafting vinyl monomers or polymers such as polystyrenes, as well as coupled poly(arylene ether) in which coupling agents such as low molecular weight polycarbonates, quinones, heterocycles and formals undergo reaction in known manner with the hydroxy groups of two poly(arylene ether) chains to produce a higher molecular weight polymer. Poly (arylene ether)s of the present invention further include combinations of any of the above.

The poly(arylene ether) generally has a number average molecular weight of about 3,000 to about 40,000 atomic mass units (AMU) and a weight average molecular weight of about 20,000 to about 80,000 AMU, as determined by gel permeation chromatography. The poly(arylene ether) generally may have an intrinsic viscosity of about 0.2 to about 0.6 deciliters per gram (dL/g) as measured in chloroform at 25° C. Within this range, the intrinsic viscosity may preferably be up to about 0.5 dL/g, more preferably up to about 0.47 dL/g. Also within this range, the intrinsic viscosity may preferably be at least about 0.3 dL/g. It is also possible to utilize a high intrinsic viscosity poly(arylene ether) and a low intrinsic viscosity poly(arylene ether) in combination. Determining an exact ratio, when two intrinsic viscosities are used, will depend on the exact intrinsic viscosities of the poly(arylene ether)s used and the ultimate physical properties desired.

The poly(arylene ether)s are typically prepared by the oxidative coupling of at least one monohydroxyaromatic compound such as 2,6-xylenol or 2,3,6-trimethylphenol.

Catalyst systems are generally employed for such coupling; they typically contain at least one heavy metal compound such as a copper, manganese or cobalt compound, usually in combination with various other materials.

Particularly useful poly(arylene ether)s for many purposes include those that comprise molecules having at least one aminoalkyl-containing end group. The aminoalkyl radical is typically located in an ortho position relative to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary-amine system. A substantial proportion of the polymer molecules, typically constituting as much as about 90% by weight of the polymer, may contain at least one of the aminoalkyl-containing and 4-hydroxybiphenyl end groups.

The composition may comprise poly(arylene ether) in an amount of about 16 to about 40 weight percent, based on the total weight of the composition. Within this range, it may be preferred to use at least about 1 8 weight percent of the poly(arylene ether). Also within this range, it may be preferred to use up to about 35 weight percent, more preferably up to about 30 weight percent of the poly(arlyene ether).

The composition further comprises a rubber-modified poly(alkenyl aromatic) resin. A rubber-modified poly(alkenyl aromatic) resin comprises a polymer derived from at least one alkenyl aromatic monomer, and further comprises a rubber modifier in the form of a blend and/or a graft.

The alkenyl aromatic monomer may have the formula

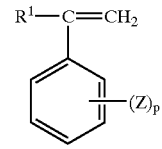

wherein $R^1$ is hydrogen, $C_1$–$C_8$ alkyl, halogen, or the like; Z is vinyl, halogen, $C_1$–$C_8$ alkyl, or the like; and p is 0 to 5. Preferred alkenyl aromatic monomers include styrene, chlorostyrenes such as p-chlorostyrene, vinyltoluenes such as p-vinyltoluene, and the like.

The rubber modifier may be a polymerization product of at least one $C_4$–$C_{10}$ nonaromatic diene monomer, such as butadiene or isoprene. The rubber-modified poly(alkenyl aromatic) resin comprises about 98 to about 70 weight percent of the poly(alkenyl aromatic) resin and about 2 to about 30 weight percent of the rubber modifier. Within these ranges, a poly(alkenyl aromatic) resin amount of at least about 88 weight percent may be preferred; and a poly(alkenyl aromatic) resin amount of up to about 94 weight percent may be preferred. Also, within these ranges, a rubber modifier amount of at least about 6 weight percent may be preferred; and a rubber modifier amount up to about 12 weight percent may be preferred.

Highly preferred rubber-modified poly(alkenyl aromatic) resins include the styrene-butadiene copolymers containing about 88 to about 94 weight percent styrene and about 6 to about 12 weight percent butadiene. These styrene-butadiene copolymers, also known as high-impact polystyrenes, are commercially available as, for example, GEH 1897 from General Electric Company, and BA 5350 from Chevron Chemical Company.

The composition may comprise the rubber-modified poly(alkenyl aromatic) resin in an amount of about 5 to about 20 weight percent, based on the total weight of the composition, with the proviso that the rubber-modified poly(alkenyl aromatic) resin accounts for at least about 30 weight percent of the total of the poly(arylene ether) and the rubber-modified poly(alkenyl aromatic) resin. Within these limitations, it may be preferred to use a rubber-modified poly(alkenyl aromatic) resin amount of about 35 to about 50 weight percent of the total of the poly(arylene ether) and the rubber-modified poly(alkenyl aromatic) resin.

The composition further comprises a polyolefin. The polyolefin may be a homopolymer or copolymer having at least about 80 weight percent of units derived from polymerization of ethylene, propylene, butylene, or a mixture thereof. Examples of polyolefin homopolymers include polyethylene, polypropylene, and polybutylene.

Examples of polyolefin copolymers include random, graft, and block copolymers of ethylene, propylene, and butylene with each other, and further comprising up to 20 weight percent of units derived from $C_5$–$C_{10}$ alpha olefins (excluding aromatic alpha-olefins). Polyolefins further include blends of the above homopolymers and copolymers. Preferred polyolefins may have a flexural modulus of at least about 100,000 pounds per square inch (psi) at 23° C. as measured according to ASTM D790. Suitable polyolefins may comprise, for example, the linear low density polyethylene available from ExxonMobil as LL-6201, the low density polyethylene available from ExxonMobil as LMA-027, the high density polyethylene available from Exxon-Mobil as HD-6605, the ultra-high molecular weight polyethylene available as Type 1900 from Montell Polyolefins, and the polybutylene (polybutene-1) available as PB0110 from Montell Polyolefins.

Presently preferred polyolefins include propylene polymers. The propylene polymer may be a homopolymer of polypropylene. Alternatively, the propylene polymer may be a random, graft, or block copolymer of propylene and at least one olefin selected from ethylene and $C_4$–$C_{10}$ alpha-olefins (excluding aromatic alpha-olefins), with the proviso that the copolymer comprises at least about 80 weight percent, preferably at least about 90 weight percent, of repeating units derived from propylene. Blends of such propylene polymers with a minor amount of another polymer such as polyethylene are also included within the scope of propylene polymers. The propylene polymer may have a melt flow index of about 0.1 to about 50 g/10 min, preferably about 1 to about 30 g/10 min when measured according to ASTM DI 238 at 2.16 kg and 200° C. The above-described propylene polymers can be produced by various known processes. Commercially available propylene polymers may also be employed.

Preferred propylene polymers include homopolypropylenes. Highly preferred propylene polymers include homopolypropylenes having a crystalline content of at least about 20%, preferably at least about 30%. Suitable isotactic polypropylenes are commercially available as, for example, PD403 pellets from Basell (formerly Montell Polyolefins of North America).

The composition may comprise the polyolefin in an amount of about 18 to about 40 weight percent, based on the total weight of the composition. Within this range, it may be preferred to use the polyolefin in an amount of at least about 20 weight percent. Also within this range, it may be preferred to use the polyolefin in an amount of up to about 40 weight percent, more preferably up to about 35 weight percent.

The composition comprises a hydrogenated block copolymer of an alkenyl aromatic compound and a conjugated diene having an alkenyl aromatic content of about 40 to about 90 weight percent (hereinafter referred to as the "hydrogenated block copolymer"). The hydrogenated block copolymer is a copolymer comprising (A) at least one block derived from an alkenyl aromatic compound and (B) at least one block derived from a conjugated diene, in which the aliphatic unsaturated group content in the block (B) is reduced by hydrogenation. The arrangement of blocks (A) and (B) includes a linear structure, a grafted structure, and a radial teleblock structure having a branched chain.

Preferred among these structures are linear structures embracing diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of A and B. More preferred are diblock, triblock, and tetrablock structures, with the A-B-A triblock structure being particularly preferred.

The alkenyl aromatic compound providing the block (A) is represented by formula

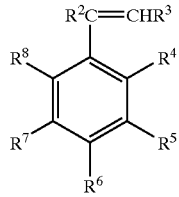

wherein $R^2$ and $R^3$ each independently represent a hydrogen atom, a $C_1$–$C_8$ alkyl group, a $C_2$–$C_8$ alkenyl group, or the like; $R^4$ and $R^8$ each independently represent a hydrogen atom, a $C_1$–$C_8$ alkyl group, a chlorine atom, a bromine atom, or the like; and $R^5$–$R^7$ each independently represent a hydrogen atom, a $C_1$–$C_8$ alkyl group, a $C_2$–$C_8$ alkenyl group, or the like, or $R^4$ and $R^5$ are taken together with the central aromatic ring to form a naphthyl group, or $R^5$ and $R^6$ are taken together with the central aromatic ring to form a naphthyl group.

Specific examples, of the alkenyl aromatic compounds include styrene, p-methylstyrene, alpha-methylstyrene, vinylxylenes, vinyltoluenes, vinylnaphthalenes, divinylbenzenes, bromostyrenes, chlorostyrenes, and the like, and combinations comprising at least one of the foregoing alkenyl aromatic compounds. Of these, styrene, alpha-methylstyrene, p-methylstyrene, vinyltoluenes, and vinylxylenes are preferred, with styrene being more preferred.

Specific examples of the conjugated diene include 1,3-butadiene, 2-methyl-1,3-butadiene, 2,3-dimethyl-1,3-butadiene, 1,3-pentadiene, and the like. Preferred among them are 1,3-butadiene and 2-methyl-1,3-butadiene, with 1,3-butadiene being more preferred.

In addition to the conjugated diene, the hydrogenated block copolymer may contain a small proportion of a lower olefinic hydrocarbon such as, for example, ethylene, propylene, 1-butene, dicyclopentadiene, a non-conjugated diene, or the like.

The content of the repeating unit derived from the alkenyl aromatic compound in the hydrogenated block copolymer may be about 40 to about 90 weight percent, based on the total weight of the hydrogenated block copolymer. Within this range, the lower limit of the alkenyl aromatic compound content may preferably be at least about 50 weight percent, more preferably at least about 55 weight percent. Also within this range, the upper limit of the alkenyl aromatic compound content may preferably be up to about 85 weight percent, more preferably up to about 75 weight percent.

There is no particular limitation on the mode of incorporation of the conjugated diene in the hydrogenated block copolymer backbone. For example, when the conjugated diene is 1,3-butadiene, it may be incorporated with about 1% to about 99% 1,2-incorporation, with the remainder being 1,4-incorporation.

The hydrogenated block copolymer is preferably hydrogenated to such a degree that fewer than 50%, more preferably fewer than 20%, yet more preferably fewer than 10%, of the unsaturated bonds in the aliphatic chain moiety derived from the conjugated diene remain unreduced. The aromatic unsaturated bonds derived from the alkenyl aromatic compound may be hydrogenated to a degree of up to about 25%.

The hydrogenated block copolymer preferably has a number average molecular weight of about 5,000 to about 500,000, AMU, as determined by gel permeation chromatography (GPC) using polystyrene standards. Within this range, the number average molecular weight is preferably at least about 10,000 AMU, more preferably at least about 30,000 AMU, yet more preferably at least about 45,000 AMU. Also within this range, the number average molecular weight is preferably up to about 300,000 AMU, more preferably up to about 200,000 AMU, yet more preferably up to about 150,000 AMU.

The molecular weight distribution of the hydrogenated block copolymer as measured by GPC is not particularly limited. The copolymer may have any ratio of weight average molecular weight to number average molecular weight.

Some of these hydrogenated block copolymers have a hydrogenated conjugated diene polymer chain to which crystallinity is ascribed. Crystallinity of the hydrogenated block copolymer can be determined by the use of a differential scanning calorimeter (DSC), for example, DSC-11 Model manufactured by Perkin-Elmer Co. Heat of fusion can be measured by a heating rate of, for example, 10° C./min in an inert gas atmosphere such as nitrogen. For example, a sample may be heated to a temperature above an estimated melting point, cooled by decreasing the temperature at a rate of 10° C./min, allowed to stand for about 1 minute, and then heated again at a rate of 10° C./min.

The hydrogenated block copolymer may have any degree of crystallinity. In view of a balance of mechanical strength of the resulting resin composition, those hydrogenated block copolymers having a melting point of about –40° C. to about 160° C. or having no definite melting point (i.e., having non-crystallinity), as measured according to the above-described technique, are preferred. Within the melting point range of about –40° C. to about 160° C., it may be preferred to use a hydrogenated block copolymer having a melting point of at least about –20° C., more preferably at least about 0° C., yet more preferably at least about 20° C., still more preferably at least about 40° C. Also within this range, it may be preferred to use a hydrogenated block copolymer having a melting point of up to about 140° C., more preferably up to about 110° C., yet more preferably up to about 100° C.

The hydrogenated block copolymer may have any glass transition temperature ($T_g$) ascribed to the hydrogenated conjugated diene polymer chain. From the standpoint of low-temperature impact strength of the resulting resin composition, it preferably has a $T_g$ of up to about –60° C., more preferably up to about –120° C. The glass transition temperature of the copolymer can be measured by the aforesaid DSC method or from the visco-elastic behavior toward temperature change as observed with a mechanical spectrometer.

Particularly preferred hydrogenated block copolymers are the styrene-(ethylene-butylene) diblock and styrene-(ethylene-butylene)-styrene triblock copolymers obtained by hydrogenation of styrene-butadiene and styrene-butadiene-styrene triblock copolymers, respectively.

The hydrogenated block copolymer may be synthesized by block polymerization followed by hydrogenation as described, for example, in U.S. Pat. No. 4,863,997 to Shibuya et al. Suitable hydrogenated block copolymers include the styrene-(ethylene-butylene) diblock and styrene-(ethylene-butylene)-styrene triblock copolymers commercially available as, for example, TUFTEC ® H1043 sold by Asahi Chemical.

The composition may comprise the hydrogenated block copolymer in an amount of about 2 to about 20 weight percent, based on the total weight of the composition. Within this range, it may be preferred to use a hydrogenated block copolymer amount of at least about 3 weight percent, more preferably at least about 5 weight percent. Also within this range, it may be preferred to use a hydrogenated block copolymer amount of up to about 15 weight percent, more preferably up to about 10 weight percent, based on the total weight of the composition.

The composition further comprises an unhydrogenated block copolymer of alkenyl aromatic compound and a conjugated diene (referred to hereinafter as the "unhydrogenated block copolymer"). The unhydrogenated block copolymer is a copolymer comprising (A) at least one block derived from an alkenyl aromatic compound and (B) at least one block derived from a conjugated diene, in which the aliphatic unsaturated group content in the block (B) has not been reduced by hydrogenation. The alkenyl aromatic compound (A) and the conjugated diene (B) are defined in detail above in the description of the hydrogenated block copolymer. The arrangement of blocks (A) and (B) includes a linear structure and a so-called radial teleblock structure having a branched chain.

Preferred of these structures are linear structures embracing diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of A and B. More preferred are diblock, triblock, and tetrablock structures, with the A-B-A triblock structure being particularly preferred.

The unhydrogenated block copolymer may comprise about 10 to about 90 weight percent of the (A) blocks. Within this range, it may be preferred to use at least about 20 weight percent (A) blocks. Also within this range, it may be preferred to use up to about 80 weight percent (A) blocks.

Particularly preferred unhydrogenated block copolymers include styrene-butadiene-styrene triblock copolymers.

Suitable unhydrogenated block copolymers may be prepared by known methods or obtained commercially as, for example, KRATON ® D series polymers, including KRATON ® D1101 and D1102, from Kraton Polymers (formerly a division of Shell Chemical).

The unhydrogenated block copolymers may be used at about 3 to about 20 weight percent, based on the total weight of the composition. Within this range, it may be preferred to use the unhydrogenated block copolymer in an amount of at least about 5 weight percent. Also within this range, it may preferred to use the unhydrogenated block copolymer in an amount up to about 5 weight percent.

The composition further comprises an ethylene/alpha-olefin elastomeric copolymer. The alpha-olefin component of the copolymer may be at least one $C_3$–$C_{10}$ alpha-olefin. Preferred alpha-olefins include propylene, 1-butene, and 1-octene. The elastomeric copolymer may be a random copolymer having about 25 to about 75 weight percent ethylene and about 75 to about 25 weight percent alpha-olefin. Within these ranges, it may be preferred to use at least about 40 weight percent ethylene; and it may be preferred to use up to about 60 weight percent ethylene. Also within these ranges, it may be preferred to use at least about 40 weight percent alpha-olefin; and it may be preferred to use up to about 60 weight percent alpha-olefin. The ethylene/alpha-olefin elastomeric copolymer may typically have a melt flow index of about 0.1 to about 20 g10 min at 2.16 kg and 200° C., and a density of about 0.8 to about 0.9 g/ml.

Particularly preferred ethylene/alpha-olefin elastomeric copolymer rubbers include ethylene-propylene rubbers, ethylene-butene rubbers, ethylene-octene rubbers, and mixtures thereof.

The ethylene/alpha-olefin elastomeric copolymer may be prepared according to known methods or obtained commercially as, for example, the neat ethylene-propylene rubber sold as VISTALON ® by ExxonMobil Chemical and the ethylene-butylene rubber sold as EXACT ® by ExxonMobil Chemical. Ethylene/alpha-olefin elastomeric copolymers may also be obtained commercially as blends in polyolefins such as, for example, the ethylene-propylene rubber pre-dispersed in polypropylene sold as product numbers Profax 7624 and Profax 8023 from Basell, and the ethylene-butene rubber pre-dispersed in polypropylene sold as Catalloy K021 P from Basell.

The ethylene/alpha-olefin elastomeric copolymer may be used in an amount of about 2 to about 20 weight percent, preferably about 5 to about 20 weight percent, based on the total weight of the composition.

Alternatively, the amount of ethylene/alpha-olefin elastomeric copolymer may be expressed as a fraction of the total of polyolefin and ethylene/alpha-olefin elastomeric copolymer. Thus, when the ethylene/alpha-olefin elastomeric copolymer is present, its amount may be expressed as about 1 to about 60 weight percent based on the combined weight of polyolefin and ethylene/alpha-olefin elastomeric copolymer. Within this range, it may be preferred to use at least about 10 weight percent of the ethylene/alpha-olefin copolymer. Also within this range, it may be preferred to use up to about 40 weight percent of the ethylene/alpha-olefin copolymer.

The composition may, optionally, further comprise a polypropylene-polystyrene graft copolymer. The polypropylene-polystyrene graft copolymer is herein defined as a graft copolymer having a propylene polymer backbone and one or more styrene polymer grafts.

The propylene polymer material that forms the backbone or substrate of the polypropylene-polystyrene graft copolymer is (a) a homopolymer of propylene; (b) a random copolymer of propylene and an olefin selected from the group consisting of ethylene and $C_4$–$C_{10}$ olefins, provided that, when the olefin is ethylene, the polymerized ethylene content is about up to 10 weight percent, preferably up to about 4 weight percent, and when the olefin is a $C_4$–$C_{10}$ olefin, the polymerized content of the $C_4$–$C_{10}$ olefin is up to about 20 weight percent, preferably up to about 16 weight percent; (c) a random terpolymer of propylene and at least two olefins selected from the group consisting of ethylene and $C_4$–$C_{10}$ alpha-olefins, provided that the polymerized $C_4$–$C_{10}$ alpha-olefin content is up to about 20 weight percent, preferably up to about 16 weight percent, and, when ethylene is one of the olefins, the polymerized ethylene content is up to about 5 weight percent, preferably up to about 4 weight percent; or (d) a homopolymer or random copolymer of propylene which is impact-modified with an ethylene-propylene monomer rubber in the reactor as well as by physical blending, the ethylene-propylene monomer rubber content of the modified polymer being about 5 to about 30 weight percent, and the ethylene content of the rubber being about 7 to about 70 weight percent, and preferably about 10 to about 40 weight percent. The $C_4$–$C_{10}$ olefins include the linear and branched $C_4$–$C_{10}$ alpha-olefins such as, for example, 1-butene, 1pentene, 3-methyl-1-butene, 4-methyl-1-pentene, 1 -hexene, 3,4-dimethyl-1-butene, 1-heptene, 1 -octene, 3-methyl-hexene, and the like. Propylene homopolymers and impact-modified propylene homopolymers are preferred propylene polymer materials. Although not preferred, propylene homopolymers and random copolymers impact modified with an ethylene-propylene-diene monomer rubber having a diene content of about 2 to about 8 weight percent also can be used as the propylene polymer material. Suitable dienes include dicyclopentadiene, 1,6-hexadiene, ethylidene norbornene, and the like.

The term "styrene polymer", used in reference to the grafted polymer present on the backbone of propylene polymer material in the polypropylene-polystyrene graft copolymer, denotes (a) homopolymers of styrene or of an alkyl styrene having at least one $C_1$–$C_1$ linear or branched alkyl ring substituent, especially a p-alkyl styrene; (b) copolymers of the (a) monomers with one another in all proportions; and (c) copolymers of at least one (a) monomer with alpha-methyl derivatives thereof, e.g., alpha-methylstyrene, wherein the alpha-methyl derivative constitutes about 1 to about 40% of the weight of the copolymer.

The polypropylene-polystyrene graft copolymer will typically comprise about 10 to about 90 weight percent of the propylene polymer backbone and about 90 to about 10 weight percent of the styrene polymer graft. Within these ranges, the propylene polymer backbone may preferably account for at least about 20 weight percent of the total graft copolymer; and the propylene polymer backbone may preferably account for up to about 40 weight percent of the total graft copolymer. Also within these ranges, the styrene polymer graft may preferably account for at least about 50 weight percent, more preferably at least about 60 weight percent, of the total graft copolymer.

The preparation of polypropylene-polystyrene graft copolymers is described, for example, in U.S. Pat. No. 4,990,558 to DeNicola, Jr. et al. Suitable polypropylene-polystyrene graft copolymers are also commercially available as, for example, P1045H1 and P1085H1 from Basell.

When the polypropylene-polystyrene graft copolymer is present, it may be used in an amount of about 0.5 to about 10 weight percent, preferably about 1 to about 10 weight percent, based on the total weight of the composition.

The composition may, optionally, further comprise a homopolymer of an alkenyl aromatic monomer, wherein the alkenyl aromatic monomer has the formula

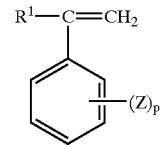

wherein $R^1$ is hydrogen, $C_1$–$C_8$ alkyl, halogen, or the like; Z is vinyl, halogen, $C_1$–$C_8$ alkyl, or the like; and p Is 0 to 5. Preferred alkenyl aromatic monomers include styrene, chlorostyrenes such as p-chlorostyrene, vinyltoluenes such as p-vinyltoluene, and the like. A particularly preferred homopolymer of an alkenyl aromatic monomer is the homopolymer derived from styrene (i.e., homopolystyrene). The homopolystyrene preferably comprises at least 99% of its weight, more preferably 100% of its weight, from styrene.

Highly preferred homopolystyrenes include atactic and syndiotactic homopolystyrenes. Suitable atactic homopolystyrenes are commercially available as, for example, EB3300 from Chevron, and P1800 from BASF. Suitable syndiotactic homopolystyrenes are commercially available, for example, under the tradename QUESTRA ® (e.g., QUESTRA ® WA550) from Dow Chemical Company.

When present, the homopolymer of an alkenyl aromatic monomer may be used in an amount of about 1 to about 30 weight percent, preferably about 1 to about 20 weight percent, based on the total weight of the composition.

The composition may, optionally, further comprise a hydrogenated block copolymer of an alkenyl aromatic compound and a conjugated diene, wherein the hydrogenated block copolymer has an alkenyl aromatic content of about 10 to less than 40 weight percent. For this component, the alkenyl aromatic compound and the conjugated diene compound are the same as those defined above for the hydrogenated block copolymer having an alkenyl aromatic content of 40 to about 90 weight percent. Such materials are commercially available as, for example, KRATON ® G1650 and G1652 from Kraton Polymers. When present, the hydrogenated block copolymer having an alkenyl aromatic content of about 10 to less than 40 weight percent may be used at about 1 weight percent to about 20 weight percent, based on the total weight of the composition.

In addition to the components described above, the composition may comprise one or more additives known in the art. Such additives may include, for example, stabilizers, mold release agents, processing aids, flame retardants, drip retardants, nucleating agents, UV blockers, dyes, pigments, particulate fillers (i.e., fillers having an aspect ratio less than about 3), reinforcing fillers, conductive fillers (e.g., conductive carbon black, and vapor grown carbon fibers having an average diameter of about 3 to about 500 nanometers), antioxidants, anti-static agents, blowing agents, and the like. Such additives are well known in the art and appropriate amounts may be readily determined.

In a preferred embodiment, the composition is substantially free of reinforcing fillers (i.e., the composition comprises less than 0.5 weight percent of reinforcing fillers, preferably less than 0.1 weight percent of reinforcing fillers, more preferably no intentionally added reinforcing fillers). For the purposes of this embodiment, a reinforcing filler is any material that is not soluble in either the poly(arylene ether)-containing phase or the polyolefin-containing phase, and which increases the flexural modulus of the composition.

In one embodiment, the composition comprises the reaction product of: about 16 to about 40 weight percent of a poly(arylene ether); about 18 to about 40 weight percent of a polyolefin; about 5 to about 20 weight percent of a rubber-modified poly (alkenyl aromatic) resin, wherein the weight ratio of the rubber-modified poly(alkenyl aromatic) resin and the poly(arylene ether) is at least about 3:7; about 2 to about 20 weight percent of a hydrogenated block copolymer of alkenyl aromatic compound and a conjugated diene having an alkenyl aromatic content of about 40 to about 90 weight percent; about 3 to about 20 weight percent of an unhydrogenated block copolymer of alkenyl aromatic compound and a conjugated diene; and about 2 to about 20 weight percent of an ethylene/alpha-olefin elastomeric copolymer; wherein all weight percents are based on the total weight of the composition.

As the composition is defined as comprising multiple components, it will be understood that each component is chemically distinct, particularly in the instance that a single chemical compound may satisfy the definition of more than one component.

The preparation of the compositions of the present invention is normally achieved by merely blending the ingredients under conditions for the formation of an intimate blend. Such conditions often include mixing in single or twin screw type extruders or similar mixing devices that can apply a shear to the components.

Preferred blending methods are described in detail in the co-filed application U.S. Ser. No. 09/682,929, which is incorporated herein in its entirety. In a preferred embodiment, the components are blended in an extruder having at least two addition ports, with at least about 50%, preferably at least about 75%, more preferably all of the poly(arylene ether) added upstream, and at least about 50%, preferably at least about 75%, yet more preferably 100%, of the polyolefin added downstream. In another preferred embodiment, the components are blended using at least two mixing stages, comprising upstream mixing and downstream mixing, wherein the upstream mixing is high-energy mixing characterized by at least two mixing elements and/or a mixing section not less than about 1 inch in length. Downstream mixing may be either high-energy mixing as described above or low-energy mixing, depending on the composition and its desired properties.

The composition after molding may have a flexural modulus at 23° C. measured according to ASTM D790 of about 100,000 pounds per square inch (psi) to at least about 230,000 psi. Within this range, a preferred value of flexural modulus may be at least about 180,000 psi, more preferably at least about 190,000 psi.

The composition after molding may have an Izod Notched Impact strength measured at 23° C. according to ASTM D256 of at least about 1 foot-pound per inch (ft-lb/in), preferably at least about 3 ft-lb/in, more preferably at least about 5 ft-lb/in, yet more preferably at least about 7 ft-lb/in.

The composition after molding may have a Dynatup (falling dart) Total Energy measured at 23° C. according to ASTM D3763 at least about 2.5 foot-pounds (ft-lb), preferably at least about 10 ft-lb, more preferably at least about 20 ft-lb. The Dynatup Total Energy at −30° C. may be at least about 1 ft-lb, preferably at least about 10 ft-lb, more preferably at least about 1 5 ft-lb.

The composition after molding may have a Dynatup Energy at failure measured at −30° C. according to ASTM D3763 may be at least about 1 ft-lb, preferably at least about 10 ft-lb, more preferably at least about 1 5 ft-lb.

The composition after molding may have a heat distortion temperature (HDT) measured at 66 psi according to ASTM D648 of at least about 160° F., preferably at least about 180° F., more preferably at least about 200° F. The heat distortion temperature (HDT) measured at 264 psi may be at least about 120° F., preferably at least about 130° F., more preferably at least about 150° F.

In a preferred embodiment, the composition after molding has a flexural modulus measured at 23° C. according to ASTM D790 of at least about 150,000 psi and an Izod Notched Impact strength measured at 23° C. according to ASTM D256 of at least about 4 ft-lb/in.

In another preferred embodiment, the composition after molding has a flexural modulus measured at 23° C. according to ASTM D790 of at least about 200,000 psi and an Izod Notched Impact strength measured at 23° C. according to ASTM D256 of at least about 7 ft-lb/in.

The composition of the invention is useful for use in a variety of articles requiring high impact strength and moderate stiffness. Such articles include automotive fascia, such as automotive bumper fascia described in, for example, U.S. Pat. No. 6,082,792 to Evans et al. The compositions may also be useful for molded trays, including molded food trays use for microwaveable foods.

The invention is further illustrated by the following non-limiting examples.

EXAMPLES 1–12

Components utilized in the preparation of the thermoplastic composition are listed and described in Table 1.

TABLE 1

| Abbreviation | Description |
|---|---|
| PP | isotactic propylene polymer obtained as PD403 (pellet form) from Montell Polyolefin Inc. |
| EPR | Ethylene-propylene copolymer, obtained as VISTALON ® 878 (pellet form) from ExxonMobil Chemical |
| EBR | Ethylene-butylene copolymer, obtained as EXACT ® 4033 (pellet form) from ExxonMobil Chemical |
| PP-g-PS | Polypropylene-polystyrene graft copolymer, obtained as Interloy Profax P1045H1 (pellet form) from Montell Polyolefin Inc. |
| PPE | poly(2,6-dimethylphenylene ether), intrinsic viscosity (IV) = 0.4 dl/g, obtained in powdered form from General Electric Company |
| xPS | homopolystyrene, obtained as Chevron EB3300 (pellet form) from Huntsman Chemical |
| HIPS | rubber-modified polystyrene having a polystyrene molecular weight of 230,000 g/mol and 10.3 weight % polybutadiene, obtained as GEH 1897 (pellet form) from General Electric Company |
| SBS D1101 | unhydrogenated styrene-butadiene-styrene triblock copolymer having about 31% polystyrene, obtained as KRATON ® D1101 (pellet form) from Shell Chemical Company |
| SEBS H1043 | hydrogenated styrene-butadiene-styrene triblock copolymer (also known as styrene-(ethylene-butadiene)-styrene triblock copolymer), 66 weight % polystyrene, obtained as TUFTEC ® H1043 (pellet form) from Asahi Chemical |

General Blending/Compounding Procedure: Using quantities specified in Table 2, PP-g-PS, PPE, xPS, HIPS, SEBS and SBS were hand mixed in a bag. Unless otherwise specified, all component quantities are expressed in parts by weight. The resulting mixture was subsequently mixed aggressively with a mechanical blender for uniformity. The uniform mixture was subsequently fed through a feeder and entered into an extruder at the extruder initial entry point. In the instance when the quantity of the polystyrene or rubber-modified polystyrene components were each equal to or greater than 10% of the total blend weight, the polystyrene or rubber-modified polystyrene components were fed thorough a separate upstream feeder. Components PP and EPR or EBR, in quantities specified in Table 2, were fed downstream. The entry points were located after the feed throat, at approximately barrel 5 of the 10-barrel extruder.

General Extrusion: a 30 millimeter co-rotating twin-screw extruder was used.

Blends were melt extruded at 520° F., 450–500 rpm, and a throughput rate of 30–55 pounds per hour. Melt from the extruder was forced through a three-hole die to produce melt strands. These strands were rapidly cooled by passing them through a cold-water bath. The cooled strands were chopped into pellets. Pellets were dried in an oven at 200° F. for 2–4 hours.

General Molding: ASTM parts were molded on a 120 tonne molding machine (manufacturer Van Dorn) at 450–550° F. barrel temperature and 100–120° F. mold temperature.

Parts were tested according to ASTM methods. Izod notched impact was measured at 23° C. and −30° C. according to ASTM D256. Dynatup (falling dart) total energy and energy to failure were measured at 23° C. and −30° C. and at 5 and 7.5 mph according to ASTM D3763. Heat distortion temperature (HDT) was measured at 66 psi and 264 psi on ⅛ inch samples according to ASTM D648. Flexural modulus and flexural strength at yield were measured at 23° C. on ⅛ inch samples according to ASTM D790. Tensile strength at yield, tensile strength at break, and tensile elongation at break were measured at 23° C. according to ASTM D638. Where presented, standard deviations reflect measurements on five samples.

The results are presented in Table 2 and show that the composition provides excellent impact strength while maintaining good stiffness. The results also show low sample-to-sample property variability.

TABLE 2

|  | Ex. 1 | Ex. 2 | Ex. 3 | Ex. 4 |
|---|---|---|---|---|
| COMPOSITION |  |  |  |  |
| PPE | 25.20 | 18.00 | 21.00 | 18.00 |
| xPS | 0.00 | 0.00 | 0.00 | 0.00 |
| HIPS | 16.80 | 12.00 | 14.00 | 12.00 |
| SBS D1101 | 10.33 | 5.00 | 15.00 | 15.00 |
| SEBS H1043 | 5.33 | 10.00 | 10.00 | 10.00 |
| PP-g-PS | 5.33 | 10.00 | 10.00 | 5.00 |
| PP | 32.00 | 40.00 | 25.00 | 20.00 |
| EBR or EPR | 5.00 | 5.00 | 5.00 | 20.00 |
| PROPERTIES |  |  |  |  |
| HDT, 66 psi, ⅛", (° F.) | 237.2 | 229.6 | 221.7 | 195.4 |
| HDT, 66 psi, ⅛", std dev (° F.) | 2.5 | 2.98 | 0.8 | 6.19 |
| HDT, 264 psi, ⅛" (° F.) | 159.3 | 152.4 | 153.1 | 149.2 |
| HDT 264 psi, ⅛" std dev (° F.) | 0.68 | 1.10 | 0.77 | 9.41 |
| Notched Izod, 23° C. (ft-lb/in) | 7.7 | 11.3 | 11.9 | 12.7 |
| Notched Izod, 23° C., std dev (ft-lb/in) | 0.4 | 0.4 | 0.3 | 0.3 |
| Notched Izod, −30° C. (ft-lb/in) | 2.6 | 1.7 | 7.4 | 14.2 |
| Notched Izod, −30° C., std dev (ft-lb/in) | 0.1 | 0.1 | 0.1 | 0.1 |
| Energy to Failure, 23° C., 7.5 mph (ft-lb) | 18.05 | 18.15 | 17.16 | 14.98 |
| Energy to Faifure, 23° C., 7.5 mph, std dev (ft-lb) | 0.39 | 0.38 | 0.07 | 0.80 |
| Total Energy, 23° C., 7.5 mph (ft-lb) | 27.39 | 31.17 | 28.49 | 24.14 |
| Total Energy, 23° C., 7.5 mph, std dev (ft-lb) | 1.85 | 0.77 | 0.46 | 1.05 |

TABLE 2-continued

|  |  |  |  |  |
|---|---|---|---|---|
| Energy to Failure, −30° C., 7.5 mph (ft-lb) | 15.02 | 20.89 | 22.3 | 18.73 |
| Energy to Failure, −30° C., 7.5 mph, std dev (ft-lb) | 6.90 | 6.76 | 0.15 | 0.28 |
| Total Energy, −30° C., 7.5 mph (ft-lb) | 16.63 | 29.17 | 31.52 | 31.99 |
| Total Energy, −30° C., 7.5 mph, std dev (ft-lb) | 8.49 | 11.00 | 2.3 | 0.67 |
| Energy to Failure, −30° C., 5 mph (ft-lb) | 17.92 | 23.77 | 20.52 | 18.67 |
| Energy to Failure, −30° C., 5 mph, std dev (ft-lb) | 6.53 | 0.36 | 0.77 | 0.41 |
| Total Energy, −30° C., 5 mph (ft-lb) | 21.15 | 35.19 | 29.01 | 30.94 |
| Total Energy, −30° C., 5 mph, std dev (ft-lb) | 9.382 | 0.420 | 2.426 | 1.760 |
| Flexural Modulus, 23° C. ⅛" (psi) | 195,200 | 190,500 | 188,400 | 109,800 |
| Flexural Modulus, 23° C. ⅛", std dev (psi) | 3,862 | 4,187 | 1,704 | 1,407 |
| Flexural Strength at yield, 23° C., ⅛" (psi) | 6,747 | 6,750 | 6,721 | 4,013 |
| Flexural Strength at yield, 23° C., ⅛", std dev (psi) | 44 | 85 | 79 | 95 |
| Tensile Strength at yield, 23° C. (psi) | 4,663 | 4,908 | 4,298 | 3,162 |
| Tensile Strength at yield, 23° C., std dev (psi) | 17.40 | 28.70 | 27.70 | 33.60 |
| Tensile Strength at break, 23° C. (psi) | 4,812 | 4,750 | 5,057 | 4,499 |
| Tensile Strength at break, 23° C., std dev (psi) | 166 | 109 | 280 | — |
| Tensile Elongation at break, 23° C. (%) | 231.3 | 311.4 | 338.0 | 400.0 |
| Tensile Elongation at break, 23° C., std dev (%) | 36.5 | 20.0 | 52.0 | — |

|  | Ex. 5 | Ex. 6 | Ex. 7 | Ex. 8 |
|---|---|---|---|---|
| COMPOSITION |  |  |  |  |
| PPE | 30.00 | 24.00 | 24.00 | 21.00 |
| xPS | 0.00 | 12.00 | 8.00 | 0.00 |
| HIPS | 20.00 | 4.00 | 8.00 | 14.00 |
| SBS D1101 | 5.00 | 5.00 | 15.00 | 5.00 |
| SEBS H1043 | 10.00 | 10.00 | 10.00 | 10.00 |
| PP-g-PS | 10.00 | 10.00 | 10.00 | 10.00 |
| PP | 20.00 | 20.00 | 20.00 | 20.00 |
| EBR or EPR | 5.00 | 15.00 | 5.00 | 20.00 |
| PROPERTIES |  |  |  |  |
| HDT, 66 psi, ⅛", (° F.) | 252.7 | 245.3 | 237.4 | 222.2 |
| HDT, 66 psi, ⅛", std dev (° F.) | 3.27 | 2.16 | 0.16 | 1.69 |
| HDT, 264 psi, ⅛" (° F.) | 182.4 | 174.3 | 171.7 | 146.5 |
| HDT 264 psi, ⅛" std dev (° F.) | 4.74 | 0.62 | 0.83 | 1.72 |
| Notched Izod, 23° C. (ft-lb/in) | 8.9 | 11.9 | 10.7 | 12.6 |
| Notched Izod, 23° C., std dev (ft-lb/in) | 0.2 | 0.2 | 0.1 | 0.1 |
| Notched Izod, −30° C. (ft-lb/in) | 2.5 | 4.7 | 6.6 | 12.5 |
| Notched Izod, −30° C., std dev (ft-lb/in) | 0.1 | 1.8 | 0.5 | 0.3 |
| Energy to Failure, 23° C., 7.5 mph (ft-lb) | 18.77 | 16.90 | 17.40 | 15.96 |
| Energy to Faifure, 23° C., 7.5 mph, std dev (ft-lb) | 0.42 | 0.52 | 0.32 | 1.94 |
| Total Energy, 23° C., 7.5 mph (ft-lb) | 24.64 | 26.58 | 26.78 | 24.61 |
| Total Energy, 23° C., 7.5 mph, std dev (ft-lb) | 2.29 | 0.59 | 0.73 | 2.61 |
| Energy to Failure, −30° C., 7.5 mph (ft-lb) | 11.42 | 22.46 | 22.27 | 20.43 |
| Energy to Failure, −30° C., 7.5 mph, std dev(ft-lb) | 3.99 | 0.43 | 0.25 | 0.25 |
| Total Energy, −30° C., 7.5 mph (ft-lb) | 12.31 | 33.5 | 30.38 | 31.01 |
| Total Energy, −30° C., 7.5 mph, std dev (ft-lb) | 3.83 | 2.25 | 1.63 | 2.26 |
| Energy to Failure, −30° C., 5 mph (ft-lb) | 20.31 | 21.40 | 21.59 | 19.74 |
| Energy to Failure, −30° C., 5 mph, std dev (ft-lb) | 2.88 | 3.46 | 1.42 | 0.40 |
| Total Energy, −30° C., 5 mph (ft-lb) | 23.02 | 32.06 | 28.89 | 30.94 |
| Total Energy, −30° C., 5 mph, std dev (ft-lb) | 4.58 | 4.68 | 3.67 | 3.06 |
| Flexural Modulus, 23° C. ⅛" (psi) | 211,200 | 178,100 | 185,400 | 136,100 |
| Flexural Modulus, 23° C. ⅛", std dev (psi) | 1,360 | 1,476 | 500 | 1,145 |
| Flexural Strength at yield, 23° C. ⅛" (psi) | 7,748 | 6,546 | 6,576 | 4,962 |
| Flexural Strength at yield, 23° C., ⅛", std dev (psi) | 46 | 48 | 28 | 65 |
| Tensile Strength at yield, 23° C. (psi) | 5,488 | 4,817 | 4,718 | 3,918 |
| Tensile Strength at yield, 23° C., std dev (psi) | 12.00 | 13.80 | 24.60 | 14.80 |
| Tensile Strength at break, 23° C. (psi) | 5,257 | 4,834 | 5,259 | 5,043 |
| Tensile Strength at break, 23° C., std dev (psi) | 118 | 162 | 339 | 133 |
| Tensile Elongation at break, 23° C. (%) | 146.7 | 185.8 | 251.4 | 326.0 |
| Tensile Elongation at break, 23° C., std dev (%) | 23.9 | 33.0 | 49.7 | 22.1 |

|  | Ex. 9 | Ex. 10 | Ex. 11 | Ex. 12 |
|---|---|---|---|---|
| COMPOSITION |  |  |  |  |
| PPE | 30.00 | 25.20 | 18.00 | 27.56 |
| xPS | 0.00 | 0.00 | 0.00 | 14.11 |
| HIPS | 20.00 | 16.80 | 12.00 | 4.26 |
| SBS D1101 | 5.00 | 10.33 | 5.00 | 5.01 |
| SEBS H1043 | 10.00 | 5.33 | 5.00 | 8.01 |
| PP-g-PS | 10.00 | 5.33 | 10.00 | 3.82 |
| PP | 20.00 | 32.00 | 30.00 | 24.23 |
| EBR or EPR | 5.00 | 5.00 | 20.00 | 13.00 |
| PROPERTIES |  |  |  |  |
| HDT, 66 psi, ⅛", (° F.) | 249 | 240 | 209 | 256 |

TABLE 2-continued

| | | | | |
|---|---|---|---|---|
| HDT, 66 psi, 1/8", std dev (° F.) | 0.36 | 2.88 | 5.22 | 0.41 |
| HDT, 264 psi, 1/8" (° F.) | 181.3 | 159 | 138.2 | 198 |
| HDT 264 psi, 1/8" std dev (° F.) | 1.32 | 2.13 | 0.47 | 2.10 |
| Notched Izod, 23° C. (ft-lb/in) | 9.5 | 6.9 | 11.3 | 10.6 |
| Notched Izod, 23° C., std dev (ft-lb/in) | 0.3 | 0.2 | 0.4 | 0.1 |
| Notched Izod, −30° C. (ft-lb/in) | 3 | 2.7 | 5.7 | 6.8 |
| Notched Izod, −30° C., std dev (ft-lb/in) | 0.1 | 0.2 | 2.8 | 1.2 |
| Energy to Failure, 23° C., 7.5 mph (ft-lb) | 19.58 | 17.26 | 15.05 | 18.09 |
| Energy to Faifure, 23° C., 7.5 mph, std dev (ft-lb) | 0.32 | 0.39 | 0.15 | 0.47 |
| Total Energy, 23° C., 7.5 mph (ft-lb) | 27.39 | 25.40 | 24.94 | 27.30 |
| Total Energy, 23° C., 7.5 mph, std dev (ft-lb) | 0.67 | 2.05 | 0.60 | 1.11 |
| Energy to Failure, −30° C., 7.5 mph (ft-lb) | 22.13 | 16.70 | 19.76 | 20.61 |
| Energy to Failure, −30° C., 7.5 mph, std dev(ft-lb) | 3.15 | 6.27 | 0.14 | 1.15 |
| Total Energy, −30° C., 7.5 mph (ft-lb) | 26.43 | 19.16 | 32.40 | 27.63 |
| Total Energy, −30° C., 7.5 mph, std dev (ft-lb) | 4.64 | 6.89 | 1.03 | 4.63 |
| Energy to Failure, −30° C., 5 mph (ft-lb) | 22.41 | 20.79 | 19.70 | 22.57 |
| Energy to Failure, −30° C., 5 mph, std dev (ft-lb) | 2.775 | 3.54 | 0.47 | 0.33 |
| Total Energy, −30° C., 5 mph (ft-lb) | 27.45 | 24.23 | 30.31 | 29.42 |
| Total Energy, −30° C., 5 mph, std dev (ft-lb) | 5.21 | 5.96 | 3.39 | 2.41 |
| Flexural Modulus, 23° C. 1/8" (psi) | 212,900 | 193,400 | 146,600 | 194,000 |
| Flexural Modulus, 23° C. 1/8", std dev (psi) | 2,436 | 4,820 | 913 | 153 |
| Flexural Strength at yield, 23° C., 1/8" (psi) | 7,699 | 6,670 | 5,116 | 7,315 |
| Flexural Strength at yield, 23° C., 1/8", std dev (psi) | 29 | 58 | 53 | 51 |
| Tensile Strength at yield, 23° C. (psi) | 5,405 | 4,700 | 3,836 | 5,153.4 |
| Tensile Strength at yield, 23° C., std dev (psi) | 17.70 | 11.30 | 18.80 | 17.14 |
| Tensile Strength at break, 23° C. (psi) | 5,325 | 4,738 | — | 5,056 |
| Tensile Strength at break, 23° C., std dev (psi) | 85 | 186 | — | 34 |
| Tensile Elongation at break, 23° C. (%) | 169.0 | 220.4 | 400.0 | 146.8 |
| Tensile Elongation at break, 23° C., std dev (%) | 17.0 | 27.7 | — | 5.9 |

EXAMPLES 13–19

These examples illustrate that the composition may enable excellent property balances even when it does not include a polypropylene-polystyrene graft copolymer. Seven compositions were prepared and tested according to the procedures described above. Compositions and property values are presented in Table 3. Standard deviations of property values are based on measurements on at least three samples.

TABLE 3

| | Ex. 13 | Ex. 14 | Ex. 15 | Ex. 16 |
|---|---|---|---|---|
| COMPOSITION | | | | |
| PPE | 27.00 | 30.00 | 21.00 | 18.00 |
| xPS | 0.00 | 0.00 | 0.00 | 0.00 |
| HIPS | 18.00 | 20.00 | 14.00 | 12.00 |
| SBS D1101 | 15.00 | 15.00 | 5.00 | 15.00 |
| SEBS H1043 | 6.7 | 10.00 | 10.00 | 10.00 |
| PP | 20.00 | 20.00 | 30.00 | 40.00 |
| EBR | 13.33 | 5.00 | 20.00 | 5.00 |
| PROPERTIES | | | | |
| HDT, 66 psi, 1/8" (° F.) | 234.5 | 245.5 | 215.4 | 201.8 |
| HDT, 66 psi, 1/8", std dev (° F.) | 2.55 | 1 | 2.76 | 2.21 |
| HDT, 264 psi, 1/8" (° F.) | 154.1 | 174.1 | 139.9 | 137.8 |
| HDT, 264 psi, 1/8", std dev (° F.) | 1.99 | 4.96 | 0.05 | 0.87 |
| Notched Izod, 23° C. (ft-lb/in) | 11.1 | 11.7 | 12.4 | 12.2 |
| Notched Izod, 23° C. std dev (ft-lb/in) | 0.2 | 0.1 | 0.3 | 0.2 |
| Notched Izod, −30° C. (ft-lb/in) | 9.8 | 8.3 | 12.3 | 6.0 |
| Notched Izod, −30° C., std dev (ft-lb/in) | 0.1 | 0.2 | 0.4 | 0.2 |
| Energy to Failure, 23° C., 7.5 mph (ft-lb) | 16.98 | 17.88 | 16.01 | 16.55 |
| Energy to Failure, 23° C., 7.5 mph, std dev (ft-lb) | 0.4 | 0.19 | 0.43 | 0.19 |
| Total Energy, 23° C., 7.5 mph (ft-lb) | 24.06 | 26.72 | 26.25 | 28.78 |
| Total Energy, 23° C., 7.5 mph, std dev (ft-lb) | 0.62 | 1.16 | 0.63 | 1.4 |
| Energy to Failure, −30° C., 7.5 mph (ft-lb) | 20.66 | 22.25 | 20.01 | 21.31 |
| Energy to Failure, −30° C., 7.5 mph, std dev (ft-lb) | 0.22 | 0.22 | 0.23 | 0.19 |
| Total Energy, −30° C., 7.5 mph (ft-lb) | 29.85 | 32.04 | 31.47 | 32.97 |
| Total Energy, −30° C., 7.5 mph, std dev (ft-lb) | 0.74 | 1.42 | 1.75 | 1.65 |
| Energy to Failure, −30° C., 5 mph (ft-lb) | 18.25 | 22.83 | 20.01 | 21.35 |
| Energy to Failure, −30° C., 5 mph, std dev (ft-lb) | 8.64 | 0.70 | 0.30 | 0.51 |
| Total Energy, −30° C., 5 mph (ft-lb) | 24.38 | 31.35 | 32.75 | 33.96 |
| Total Energy, −30° C., 5 mph, std dev (ft-lb) | 8.64 | 2.81 | 0.88 | 2.60 |
| Flexural Modulus, 23° C., 1/8" (psi) | 142,000 | 180,100 | 117,800 | 151,200 |
| Flexural Modulus, 23° C., 1/8", std dev (psi) | 715 | 1,211 | 7,031 | 6,114 |
| Flexural Strength at yield, 23° C., 1/8" (psi) | 5,200 | 6,580 | 4,494 | 5,239 |
| Flexural Strength at yield, 23° C. 1/8", std dev | 20 | 20 | 265 | 226 |

TABLE 3-continued

| | | | | |
|---|---|---|---|---|
| (psi) | | | | |
| Tensile Strength at yield, 23° C. (psi) | 3,945 | 4,564 | 3,700 | 3,950 |
| Tensile Strength at yield, 23° C. std dev (psi) | 78.4 | 8.4 | 32.3 | 26.7 |
| Tensile Strength at break, 23° C. (psi) | 4,602 | 5,112 | 4,771 | 4,202 |
| Tensile Strength at break, 23° C., std dev (psi) | 224 | 76 | 306 | — |
| Tensile Elongation at break, 23° C. (%) | 213.44 | 202.06 | 329.91 | 379.80 |
| Tensile Elongation at break, 23° C., std dev (%) | 33.0 | 10.3 | 58.4 | 45.1 |

| | Ex. 17 | Ex. 18 | Ex. 19 |
|---|---|---|---|
| COMPOSITION | | | |
| PPE | 18.00 | 22.00 | 30.00 |
| xPS | 6.00 | 3.70 | 0.00 |
| HIPS | 6.00 | 11.00 | 20.00 |
| SBS D1101 | 15.00 | 5.00 | 15.00 |
| SEBS H1043 | 10.00 | 10.00 | 10.00 |
| PP | 40.00 | 40.00 | 20.00 |
| EBR | 5.00 | 8.30 | 5.00 |
| PROPERTIES | | | |
| HDT, 66 psi, 1/8" (° F.) | 214.6 | 221.5 | 244.4 |
| HDT, 66 psi, 1/8", std dev (° F.) | 0.91 | 9.5 | 2.3 |
| HDT, 264 psi, 1/8" (° F.) | 147 | 153.2 | 179 |
| HDT, 264 psi, 1/8", std dev (° F.) | 0 | 2.2 | 3.2 |
| Notched Izod, 23° C. (ft-lb/in) | 12.4 | 11.9 | 11.7 |
| Notched Izod, 23° C. std dev (ft-lb/in) | 0.2 | 0.2 | 0.1 |
| Notched Izod, −30° C. (ft-lb/in) | 2.6 | 1.7 | 8 |
| Notched Izod, −30° C., std dev (ft-lb/in) | 0.1 | 0.2 | 0.6 |
| Energy to Failure, 23° C., 7.5 mph (ft-lb) | 14.57 | 16.54 | 17.59 |
| Energy to Failure, 23° C., 7.5 mph, std dev (ft-lb) | 0.25 | 0.34 | 0.19 |
| Total Energy, 23° C., 7.5 mph (ft-lb) | 25.72 | 29.18 | 26.77 |
| Total Energy, 23° C., 7.5 mph, std dev (ft-lb) | 0.74 | 1.30 | 0.68 |
| Energy to Failure, −30° C., 7.5 mph (ft-lb) | 20.87 | 22.61 | 22.1 |
| Energy to Failure, −30° C., 7.5 mph, std dev (ft-lb) | 0.11 | 0.87 | 0.76 |
| Total Energy, −30° C., 7.5 mph (ft-lb) | 29.59 | 35.28 | 30.66 |
| Total Energy, −30° C., 7.5 mph, std dev (ft-lb) | 1.79 | 2.99 | 3.04 |
| Energy to Failure, −30° C., 5 mph (ft-lb) | 20.13 | 23.02 | 23.84 |
| Energy to Failure, −30° C., 5 mph, std dev (ft-lb) | 1.71 | 0.50 | 3.04 |
| Total Energy, −30° C., 5 mph (ft-lb) | 27.41 | 35.81 | 34.02 |
| Total Energy, −30° C., 5 mph, std dev (ft-lb) | 5.66 | 5.30 | 1.37 |
| Flexural Modulus, 23° C., 1/8" (psi) | 165,200 | 175,800 | 188,300 |
| Flexural Modulus, 23° C., 1/8", std dev (psi) | 1,890 | 474 | 2.028 |
| Flexural Strength at yield, 23° C., 1/8" (psi) | 5,873 | 6,332 | 6,752 |
| Flexural Strength at yield, 23° C. 1/8", std dev (psi) | 52 | 57 | 22 |
| Tensile Strength at yield, 23° C. (psi) | 4,069 | 4,635 | 4,621 |
| Tensile Strength at yield, 23° C. std dev (psi) | 26.4 | 26.1 | 22.1 |
| Tensile Strength at break, 23° C. (psi) | 4,287 | — | 5,051 |
| Tensile Strength at break, 23° C., std dev (psi) | 0 | 0 | 92.8 |
| Tensile Elongation at break, 23° C. (%) | 375 | 400 | 186 |
| Tensile Elongation at break, 23° C., std dev (%) | 55.4 | 0 | 9.25 |

EXAMPLES 20–26

These examples further illustrate that the composition may enable excellent property balances even when it does not include a polypropylene-polystyrene graft copolymer. Eight compositions were prepared and tested according to the procedures described above. Compositions and property values are presented in Table 4. Standard deviations of property values are based on measurements on at least three samples.

TABLE 4

| | Ex. 20 | Ex. 21 | Ex. 22 | Ex. 23 |
|---|---|---|---|---|
| COMPOSITION | | | | |
| PPE | 30.00 | 21.00 | 18.00 | 18.00 |
| xPS | 0.00 | 0.00 | 0.00 | 6.00 |
| HIPS | 20.00 | 14.00 | 12.00 | 6.00 |
| SBS D1101 | 15.00 | 5.00 | 15.00 | 15.00 |
| SEBS H1043 | 10.00 | 10.00 | 10.00 | 10.00 |
| PP | 20.00 | 30.00 | 40.00 | 40.00 |
| EBR | 5.00 | 20.00 | 5.00 | 5.00 |
| PROPERTIES | | | | |
| HDT, 66 psi, 1/8" (° F.) | 245.4 | 215.4 | 201.8 | 214.6 |

TABLE 4-continued

| | | | | |
|---|---|---|---|---|
| HDT, 264 psi, 1/8" (° F.) | 174 | 139.9 | 137.8 | 147 |
| Notched Izod, 23° F. (ft-lb/in) | 11.7 | 12.4 | 12.2 | 12.4 |
| Notched Izod, −30° F. (ft-lb/in) | 8.3 | 12.3 | 6 | 2.6 |
| Energy to Failure, 23° C., 7.5 mph (ft-lb) | 17.88 | 16.01 | 16.55 | 14.57 |
| Energy to Failure, 23° C., 7.5 mph, std dev (ft-lb) | 0.19 | 0.43 | 0.19 | 0.25 |
| Total Energy, 23° C., 7.5 mph (ft-lb) | 26.72 | 26.25 | 28.78 | 25.72 |
| Total Energy, 23° C., 7.5 mph, std dev (ft-lb) | 1.16 | 0.63 | 1.40 | 0.74 |
| Energy to Failure, −30° C., 7.5 mph (ft-lb) | 22.25 | 20.01 | 21.31 | 20.87 |
| Energy to Failure, −30° C., 7.5 mph, std dev (ft-lb) | 0.22 | 0.23 | 0.19 | 0.11 |
| Total Energy, −30° C., 7.5 mph (ft-lb) | 32.04 | 31.47 | 32.97 | 29.59 |
| Total Energy, −30° C., 7.5 mph, std dev (ft-lb) | 1.42 | 1.75 | 1.65 | 1.79 |
| Energy to Failure, −30° C., 5 mph (ft-lb) | 22.83 | 20.01 | 21.35 | 20.13 |
| Energy to Failure, −30° C., 5 mph, std dev (ft-lb) | 0.70 | 0.30 | 0.51 | 1.71 |
| Total Energy, −30° C., 5 mph (ft-lb) | 31.35 | 32.75 | 33.96 | 27.41 |
| Total Energy, −30° C., 5 mph, std dev (ft-lb) | 2.81 | 0.88 | 2.6 | 5.66 |
| Flexural Modulus, 23° C., 1/8" (psi) | 180,100 | 117,800 | 151,200 | 165,200 |
| Flexural Strength at yield, 23° C. 1/8" (psi) | 6,580 | 4,494 | 5,239 | 5,873 |
| Tensile Strength at yield, 23° C. 1/8" (psi) | 4,564 | 3,700 | 3,950 | 4,069 |
| Tensile Strength at break, 23° C. (psi) | 5,112 | 4,771 | 4,202 | 4,287 |
| Tensile Elongation at break, 23° C. (%) | 202.06 | 329.91 | 379.80 | 375.00 |

| | Ex. 24 | Ex. 25 | Ex. 26 |
|---|---|---|---|
| COMPOSITION | | | |
| PPE | 22.00 | 30.00 | 18.00 |
| xPS | 3.70 | 0.00 | 0.00 |
| HIPS | 11.00 | 20.00 | 12.00 |
| SBS D1101 | 5.00 | 15.00 | 0.00 |
| SEBS H1043 | 10.0 | 10.00 | 5.00 |
| PP | 40.00 | 20.00 | 50.00 |
| EBR | 8.33 | 5.00 | 15.00 |
| PROPERTIES | | | |
| HDT, 66 psi, 1/8" (° F.) | 221.5 | 244.4 | 217 |
| HDT, 264 psi, 1/8" (° F.) | 153.2 | 179 | 139.7 |
| Notched Izod, 23° F. (ft-lb/in) | 11.9 | 11.7 | 11.9 |
| Notched Izod, −30° F. (ft-lb/in) | 1.7 | 8 | 2.3 |
| Energy to Failure, 23° C., 7.5 mph (ft-lb) | 16.54 | 17.59 | 17.2 |
| Energy to Failure, 23° C., 7.5 mph, std dev (ft-lb) | 0.34 | 0.19 | 0.17 |
| Total Energy, 23° C., 7.5 mph (ft-lb) | 29.18 | 26.77 | 27.92 |
| Total Energy, 23° C., 7.5 mph, std dev (ft-lb) | 1.30 | 0.68 | 0.66 |
| Energy to Failure, −30° C., 7.5 mph (ft-lb) | 22.6 | 22.1 | 17.2 |
| Energy to Failure, −30° C., 7.5 mph, std dev (ft-lb) | 0.87 | 0.76 | 0.17 |
| Total Energy, −30° C., 7.5 mph (ft-lb) | 35.28 | 30.66 | 27.92 |
| Total Energy, −30° C., 7.5 mph, std dev (ft-lb) | 2.99 | 3.04 | 0.66 |
| Energy to Failure, −30° C., 5 mph (ft-lb) | 23.02 | 23.84 | 18.04 |
| Energy to Failure, −30° C., 5 mph, std dev (ft-lb) | 0.50 | 0.46 | 3.95 |
| Total Energy, −30° C., 5 mph (ft-lb) | 35.81 | 34.02 | 24.97 |
| Total Energy, −30° C., 5 mph, std dev (ft-lb) | 5.30 | 1.37 | 8.11 |
| Flexural Modulus, 23° C., 1/8" (psi) | 175,800 | 188,300 | 152,900 |
| Flexural Strength at yield, 23° C. 1/8" (psi) | 6,332 | 6,752 | 5,465 |
| Tensile Strength at yield, 23° C. 1/8" (psi) | 4,635 | 4,621 | 4,289 |
| Tensile Strength at break, 23° C. (psi) | — | 5,051 | 1,831.8 |
| Tensile Elongation at break, 23° C. (%) | 400 | 186.1 | 137.5 |

EXAMPLES 27–30

COMPARATIVE EXAMPLES 1–4

These examples and comparative examples illustrate the impact strength advantages associated with the presence of an unhydrogenated block copolymer in the composition. Eight compositions were prepared and tested according to the procedures described above. Components are the same as those described in Table 1, except that the poly(arylene ether) (PPE) had an intrinsic viscosity of 0.46 dL/g as measured at 25° C. in chloroform. "Additives" refers to a 1:1:3 weight ratio blend of magnesium oxide, zinc sulfide, and tridodecyl phosphite. Compositions and property values are presented in Table 5. The results show that the examples with unhydrogenated block copolymer exhibit superior notched Izod impact strength at 23° C. and −30° C., Energy at Maximum Load at −30° C., and Energy at Failure at −30° C. versus comparative examples lacking the unhydrogenated block copolymer.

TABLE 5

| | C. Ex. 1 | Ex. 27 | C. Ex. 2 | Ex. 28 |
|---|---|---|---|---|
| COMPOSITION | | | | |
| PP, PD403 | 40.00 | 40.00 | 36.00 | 36.00 |

TABLE 5-continued

|  |  |  |  |  |
|---|---|---|---|---|
| EBR | 0.00 | 0.00 | 4.00 | 4.00 |
| SBS | 0.00 | 4.00 | 0.00 | 4.00 |
| SEBS H1043 | 10.00 | 10.00 | 10.00 | 10.00 |
| HIPS | 20.00 | 16.00 | 20.00 | 16.00 |
| PPE 0.46 IV | 30.00 | 30.00 | 30.00 | 30.00 |
| Additives | 0.00 | 0.25 | 0.25 | 0.25 |
| PROPERTIES |  |  |  |  |
| Flexural Modulus, 23° C., 1/8" (psi) | 233,100 | 220,700 | 207,200 | 195,800 |
| std. dev. | 2,085 | 3,046 | 969 | 2,280 |
| Flexural Strength at Yield, 23° C., 1/8" (psi) | 8,720 | 8,125 | 7,706 | 7,246 |
| std. dev | 20 | 138 | 19 | 49 |
| HDT, 264 psi, 1/8" (° F.) | 184.7 | 175.1 | 177.3 | 164.3 |
| std. dev. | 4.9 | 5.5 | 1.4 | 3.1 |
| HDT, 66 psi, 1/8" (° F.) | 259.2 | 254.7 | 258.4 | 251.0 |
| std. dev. | 2.0 | 1.0 | 2.4 | 1.9 |
| Notched Izod, 23° C. (ft-lb/in) | 2.3 | 3.6 | 5.9 | 7.6 |
| std. dev | 0.1 | 0.1 | 0.5 | 0.1 |
| Notched Izod, −30° C. (ft-lb/in) | 1.1 | 1.5 | 1.7 | 2.4 |
| std. dev. | 0.1 | 0.1 | 0.2 | 0.2 |
| Energy to Maximum Load, 23° C., 7.5 mph (ft-lb) | 18.26 | 18.62 | 19.27 | 18.53 |
| std. dev | 5.35 | 0.62 | 0.38 | 0.36 |
| Energy to Failure, 23° C., 7.5 mph (ft-lb) | 25.53 | 29.24 | 28.89 | 28.90 |
| std. dev | 9.10 | 1.13 | 1.17 | 1.05 |
| Energy to Maximum Load, −30°C., 7.5 mph (ft-lb) | 12.80 | 22.07 | 18.36 | 23.54 |
| std. dev | 7.77 | 3.62 | 9.18 | 1.65 |
| Energy to Failure, −30° C., 7.5 mph (ft-lb) | 13.31 | 28.50 | 23.25 | 29.11 |
| std. dev | 7.99 | 8.86 | 13.10 | 5.11 |
| Energy to Maximum Load, −30° C., 5 mph (ft-lb) | 16.22 | 22.32 | 16.62 | 19.73 |
| std. dev | 7.50 | 0.94 | 4.63 | 3.9 |
| Energy to Failure, −30° C., 5 mpb (ft-lb) | 18.06 | 27.92 | 17.65 | 24.99 |
| std. dev | 9.30 | 6.19 | 5.30 | 7.58 |
| Tensile Strength at Yield, 23° C. (psi) | 6,058 | 5,708 | 5,606 | 5,229 |
| std. dev | 35.3 | 25.8 | 11.4 | 7.1 |
| Tensile Strength at Break, 23° C. (psi) | 5,254 | 5,259 | 5,136 | 5,152 |
| std. dev | 96.5 | 25.8 | 112.7 | 64.1 |
| Tensile Elongation at Break, 23° C. (%) | 117.35 | 189.37 | 135.09 | 204.03 |
| std. dev | 21.03 | 11.59 | 29.21 | 8.26 |

|  | C. Ex. 3 | Ex. 29 | C. Ex. 4 | Ex. 30 |
|---|---|---|---|---|
| COMPOSITION |  |  |  |  |
| PP, PD403 | 32.00 | 27.00 | 27.00 | 22.00 |
| EBR | 0.00 | 0.00 | 5.00 | 5.00 |
| SBS | 0.00 | 5.00 | 0.00 | 5.00 |
| SEBS H1043 | 8.00 | 8.00 | 8.00 | 8.00 |
| HIPS | 15.00 | 15.00 | 15.00 | 15.00 |
| PPE 0.46 IV | 45.00 | 45.00 | 45.00 | 45.00 |
| Additives | 0.00 | 0.25 | 0.25 | 0.25 |
| PROPERTIES |  |  |  |  |
| Flexural Modulus, 23° C., 1/8" (psi) | 252,600 | 247,500 | 224,600 | 222,400 |
| std. dev | 2,699 | 1,810 | 1,910 | 2,037 |
| Flexural Strength at Yield, 23° C., 1/8" (psi) | 9,577 | 9,350 | 8,537 | 8,382 |
| std. dev | 49 | 25 | 55 | 19 |
| HDT, 264 psi, 1/8" (° F.) | 200.9 | 198.7 | 205.7 | 209.1 |
| std. dev. | 5.4 | 9.2 | 2.6 | 4.2 |
| HDT, 66 psi, 1/8" (° F.) | 286.6 | 282.5 | 291.1 | 289.3 |
| std. dev. | 2.4 | 6.6 | 1.4 | 0.6 |
| Notched Izod, 23° C. (ft-lb/in) | 2.0 | 3.0 | 4.6 | 6.8 |
| std. dev | 0.1 | 0.1 | 0.3 | 0.4 |
| Notched Izod, −30° C. (ft-lb/in) | 1.3 | 1.6 | 2.1 | 2.4 |
| std. dev. | 0.1 | 0.2 | 0.2 | 0.2 |
| Energy to Maximum Load, 23° C., 7.5 mph (ft-lb) | 21.90 | 21.25 | 20.28 | 20.41 |
| std. dev | 0.43 | 0.46 | 0.55 | 0.63 |
| Energy to Failure, 23° C., 7.5 mph (ft-lb) | 28.48 | 28.72 | 27.20 | 27.60 |
| std. dev | 1.37 | 1.05 | 2.83 | 1.02 |
| Energy to Maximum Load, −30°C., 7.5 mph (ft-lb) | 15.31 | 20.09 | 25.85 | 26.96 |
| std. dev | 5.62 | 5.28 | 2.05 | 0.23 |
| Energy to Failure, −30° C., 7.5 mph (ft-lb) | 15.82 | 20.77 | 30.72 | 31.66 |
| std. dev | 5.72 | 5.42 | 6.04 | 1.99 |

TABLE 5-continued

| | | | | |
|---|---|---|---|---|
| Energy to Maximum Load, −30° C., 5 mph (ft-lb) | 13.62 | 19.62 | 24.56 | 24.83 |
| std. dev | 5.21 | 7.81 | 1.61 | 1.3 |
| Energy to Failure, −30° C., 5 mpb (ft-lb) | 13.97 | 21.72 | 29.27 | 29.39 |
| std. dev | 5.31 | 9.59 | 4.06 | 3.19 |
| Tensile Strength at Yield, 23° C. (psi) | 6,473 | 6,451 | 6,156 | 5,953 |
| std. dev | 41.6 | 16.7 | 21.2 | 11.7 |
| Tensile Strength at Break, 23° C. (psi) | 5,733 | 5,702 | 5,605 | 5,551 |
| std. dev | 120.4 | 102.7 | 52.2 | 57.4 |
| Tensile Elongation at Break, 23° C. (%) | 56.24 | 47.21 | 58.36 | 40.86 |
| std. dev | 6.07 | 3.49 | 4.53 | 3.02 |

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from scope thereof. Therefore, it is intended that the invention not be limited to the particular embodiment disclosed as the best mode contemplated for carrying out this invention, but that the invention will include all embodiments falling within the scope of the appended claims.

All cited patents, patent applications, and other references are incorporated herein by reference in their entirety.

What is claimed is:

1. A thermoplastic composition, comprising:
    about 16 to about 40 weight percent of a poly(arylene ether);
    about 1 8 to about 40 weight percent of a polyolefin;
    about 5 to about 20 weight percent of a rubber-modified poly(alkenyl aromatic) resin, wherein the weight ratio of the rubber-modified poly(alkenyl aromatic) resin to the poly(arylene ether) is at least about 3:7;
    about 2 to about 20 weight percent of a hydrogenated block copolymer of alkenyl aromatic compound and a conjugated diene having an alkenyl aromatic content of about 40 to about 90 weight percent;
    about 3 to about 20 weight percent of an unhydrogenated block copolymer of alkenyl aromatic compound and a conjugated diene; and
    about 2 to about 20 weight percent of an ethylene/alpha-olefin elastomeric copolymer;
    wherein all weight percents are based on the total weight of the composition.

2. The thermoplastic composition of claim 1, wherein the poly(arylene ether) comprises a plurality of structural units of the formula

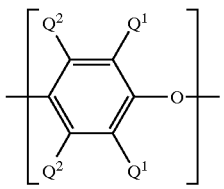

wherein for each structural unit, each $Q^1$ is independently halogen, primary or secondary $C_1$–$C_8$ alkyl, phenyl, $C_1$–$C_8$ haloalkyl, $C_1$–$C_8$ aminoalkyl, $C_1$–$C_8$ hydrocarbonoxy, or $C_2$–$C_8$ halohydrocarbonoxy wherein at least two carbon atoms separate the halogen and oxygen atoms; and each $Q^2$ is independently hydrogen, halogen, primary or secondary $C_1$–$C_8$ alkyl, phenyl, $C_1$–$C_8$ haloalkyl, $C_1$–$C_8$ aminoalkyl, $C_1$–$C_8$ hydrocarbonoxy, or $C_2$–$C_8$ halohydrocarbonoxy wherein at least two carbon atoms separate the halogen and oxygen atoms.

3. The thermoplastic composition of claim 2, wherein each $Q^1$ is independently $C_1$–$C_4$ alkyl or phenyl, and each $Q^2$ is independently hydrogen or methyl.

4. The thermoplastic composition of claim 1, wherein the poly(arylene ether) has an intrinsic viscosity of about 0.2 to about 0.6 dL/g as measured in chloroform at 25° C.

5. The thermoplastic composition of claim 1, wherein the poly(arylene ether) comprises a copolymer of 2,6-dimethylphenol and 2,3,6-trimethylphenol.

6. The thermoplastic composition of claim 1, wherein the polyolefin comprises a homopolymer or copolymer having at least about 80 weight percent of units derived from polymerization of ethylene, propylene, butylene, or a mixture thereof.

7. The thermoplastic composition of claim 1, wherein the polyolefin is a propylene polymer; and wherein the propylene polymer comprises a homopolymer of polypropylene, or a random, graft, or block copolymer of propylene and at least one olefin selected from ethylene and $C_4$–$C_{10}$ alpha-olefins, with the proviso that the copolymer comprises at least about 80 weight percent of repeating units derived from propylene.

8. The thermoplastic composition of claim 1, wherein the rubber-modified poly (alkenyl aromatic) resin comprises a polymer derived from at least one alkenyl aromatic monomer, and further comprises a rubber modifier in the form of a blend and/or a graft.

9. The thermoplastic composition of claim 8, wherein the alkenyl aromatic monomer has the formula

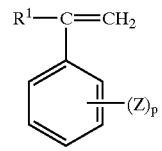

wherein $R^1$ is hydrogen, $C_1$–$C_8$ alkyl, or halogen; Z is vinyl, halogen, or $C_1$–$C_8$ alkyl; and p is 0 to 5.

10. The thermoplastic composition of claim 8, wherein the rubber modifier comprises a polymerization product of at least one $C_4$–$C_{10}$ nonaromatic diene monomer.

11. The thermoplastic composition of claim 1, wherein the hydrogenated block copolymer comprises:

(A) at least one block derived from an alkenyl aromatic compound having the formula

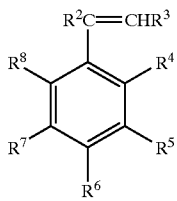

wherein $R^2$ and $R^3$ each represent a hydrogen atom, a $C_1$–$C_8$ alkyl group, or a $C_2$–$C_8$ alkenyl group; $R^4$ and $R^8$ each represent a hydrogen atom, a $C_1$–$C_8$ alkyl group, a chlorine atom, or a bromine atom; and $R^5$–$R^7$ each independently represent a hydrogen atom, a $C_1$–$C_8$ alkyl group, or a $C_2$–$C_8$ alkenyl group, or $R^4$ and $R^5$ are taken together with the central aromatic ring to form a naphthyl group, or $R^5$ and $R^6$ are taken together with the central aromatic ring to form a naphthyl group including; and (B) at least one block derived from a conjugated diene, in which the aliphatic unsaturated group content in the block (B) is reduced by hydrogenation.

12. The thermoplastic composition of claim 1, wherein the hydrogenated block copolymer has a styrene content of about 50 to about 85 weight percent.

13. The thermoplastic composition of claim 1, wherein the hydrogenated block copolymer has a styrene content of about 55 to about 70 weight percent.

14. The thermoplastic composition of claim 1, wherein the unhydrogenated block copolymer comprises a styrene-butadiene diblock copolymer, a styrene-butadiene-styrene triblock copolymer, or a mixture thereof.

15. The thermoplastic composition of claim 1, wherein the ethylene/alpha-olefin elastomeric copolymer comprises a copolymer of ethylene and at least one $C_3$–$C_{10}$ alpha-olefin.

16. The thermoplastic composition of claim 1, wherein the ethylene/alpha-olefin elastomeric copolymer comprises an ethylene-butylene rubber, an ethylene-propylene rubber, or a mixture thereof.

17. The thermoplastic composition of claim 1, further comprising about 0.5 to about 10 weight percent of a polypropylene-polystyrene graft copolymer having a propylene polymer backbone and one or more styrene polymer grafts.

18. The thermoplastic composition of claim 17, wherein the polypropylene-polystyrene graft copolymer comprises about 10 to about 90 weight percent propylene polymer backbone and about 90 to about 10 weight percent styrene polymer grafts.

19. The composition of claim 1, further comprising about 1 to about 30 weight percent of a homopolymer of an alkenyl aromatic monomer.

20. The composition of claim 19, wherein the alkenyl aromatic monomer has the formula

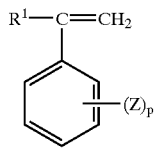

wherein $R^1$ is hydrogen, $C_1$–$C_8$ alkyl, or halogen; Z is vinyl, halogen, or $C_1$–$C_8$ alkyl; and p is 0 to 5.

21. The composition of claim 19, wherein the homopolymer of an alkenyl aromatic monomer comprises homopolystyrene.

22. The composition of claim 19, wherein the homopolymer of an alkenyl aromatic monomer comprises atactic homopolystyrene, syndiotactic polystyrene, or a mixture thereof.

23. The thermoplastic composition of claim 1, further comprising a hydrogenated block copolymer of an alkenyl aromatic compound and a conjugated diene, wherein the hydrogenated block copolymer has an alkenyl aromatic content of about 10 to less than 40 weight percent.

24. The thermoplastic composition of claim 1, further comprising at least one additive selected from the group consisting of stabilizers, mold release agents, processing aids, flame retardants, drip retardants, nucleating agents, UV blockers, dyes, pigments, particulate fillers, reinforcing fillers, conductive fillers, anti-static agents, blowing agents, and antioxidants.

25. The thermoplastic composition of claim 1, wherein the composition is substantially free of reinforcing fillers.

26. The composition of claim 1, wherein the composition after molding has a flexural modulus measured at 23° C. according to ASTM D790 of at least about 100,000 pounds per square inch.

27. The composition of claim 1, wherein the composition after molding has an Izod Notched Impact strength measured at 23° C. according to ASTM D256 of at least about 1 foot-pound per inch.

28. The composition of claim 1, wherein the composition after molding has an Izod Notched Impact strength measured at 23° C. according to ASTM D256 of at least about 4 foot-pounds per inch.

29. The composition of claim 1, wherein the composition after molding has an Izod Notched Impact strength measured at 23° C. according to ASTM D256 of at least about 7 foot-pounds per inch.

30. The composition of claim 1, wherein the composition after molding has a heat distortion temperature measured at 66 psi according to ASTM D648 of at least about 170° F.

31. The composition of claim 1, wherein the composition after molding has a flexural modulus measured at 23° C. according to ASTM D790 of at least about 150,000 pounds per square inch and an Izod Notched Impact strength measured at 23° C. according to ASTM D256 of at least about 4 foot-pounds inch.

32. The composition of claim 1, wherein the composition after molding has a flexural modulus measured at 23° C. according to ASTM D790 of at least about 200,000 pounds per square inch and an Izod Notched Impact strength measured at 23° C. according to ASTM D256 of at least about 7 foot-pounds inch.

33. A thermoplastic composition, comprising the reaction product of:
about 16 to about 40 weight percent of a poly(arylene ether);
about 18 to about 40 weight percent of a polyolefin;
about 5 to about 20 weight percent of a rubber-modified poly(alkenyl aromatic) resin, wherein the rubber-modified poly(alkenyl aromatic) resin accounts for at least about 30 weight percent of the total of the poly(arylene ether) and the rubber-modified poly(alkenyl aromatic) resin;
about 2 to about 20 weight percent of a hydrogenated block copolymer of alkenyl aromatic compound and a conjugated diene having an alkenyl aromatic content of about 40 to about 90 weight percent;
about 3 to about 20 weight percent of an unhydrogenated block copolymer of alkenyl aromatic compound and a conjugated diene; and about 2 to about 20 weight percent of an ethylene/alpha-olefin elastomeric copolymer;

wherein all weight percents are based on the total weight of the composition.

34. An article comprising the composition of claim 33.

35. An automotive component comprising the composition of claim 33.

36. An automotive fascia comprising the composition of claim 33.

37. A food tray comprising the composition of claim 33.

38. A sheet comprising the composition of claim 33.

* * * * *

UNITED STATES PATENT AND TRADEMARK OFFICE
CERTIFICATE OF CORRECTION

PATENT NO.   : 6,495,630 B2
DATED        : December 17, 2002
INVENTOR(S)  : Adeyinka Adedeji et al.

It is certified that error appears in the above-identified patent and that said Letters Patent is hereby corrected as shown below:

Title page,
Item [73], Assignee, after "Company," delete "Pittsfield, MA" and insert
-- Schenectady, NY --.

Column 1,
Line 15, after "No." delete "4,713,41 6" and insert -- 4,713,416 --;
Line 35, after "No." delete "5,071,91 2" and insert -- 5,071,912 --;
Line 60, after "No." delete "41 2,787 A2" and insert -- 412,787 A2 --.

Column 4,
Line 15, after "about" delete "1 8" and insert -- 18 --.

Column 5,
Line 15, after "ASTM" delete "DI 238" and insert -- D1238 --.

Column 8,
Line 55, before "preferred" insert -- be --;
Line 56, after "about" delete "5" and insert -- 15 --.

Column 9,
Line 4, after "about" delete "20 g10 min" and insert -- 20g/10 min --;
Line 13, after "VISTALON®" insert -- 878 --;
Line 14, after "EXACT®" insert -- 4033 --.

Column 10,
Line 2, after "1-butene," delete "1pentene," and insert -- 1-pentene --;
Line 57, after "and p" delete "Is" and insert -- is --.

Column 12,
Line 20, after "about" delete "I" and insert -- 1 --;
Lines 41 and 45, after "about" delete "1 5" and insert -- 15 --;
Line 44, after "D 3763" insert -- and --.

Column 13,
Line 2, before "for" delete "use" and insert -- used --.

Column 14,
Line 58, delete "2.5" and insert -- 2.8 --;
Line 65, after "Energy to" delete "Faifure" and insert -- Failure --.

UNITED STATES PATENT AND TRADEMARK OFFICE
CERTIFICATE OF CORRECTION

PATENT NO. : 6,495,630 B2
DATED : December 17, 2002
INVENTOR(S) : Adeyinka Adedeji et al.

It is certified that error appears in the above-identified patent and that said Letters Patent is hereby corrected as shown below:

Column 15,
Line 42, after "Energy to" delete "Faifure" and insert -- Failure --.

Column 17,
Line 38, after "Energy to" delete "Faifure" and insert -- Failure --.

Column 18,
Line 58, delete "8.64" and insert -- 6.45 --.

Column 19,
Line 34, delete "3.04" and insert -- 0.46 --.

Column 23,
Line 31, delete "mpb" and insert -- mph --.

Column 25,
Line 5, delete "mpb" and insert -- mph --;
Line 22, after "from " insert -- the --;
Line 22, before "scope" insert -- essential --;
Line 33, after "about" (first occurrence) delete "1 8" and insert -- 18 --.

Signed and Sealed this

Twenty-first Day of February, 2006

JON W. DUDAS
*Director of the United States Patent and Trademark Office*